(12) United States Patent
Tamura et al.

(10) Patent No.: US 10,115,178 B2
(45) Date of Patent: Oct. 30, 2018

(54) IMAGE PROCESSING APPARATUS, IMAGE CAPTURING APPARATUS, IMAGE PROCESSING METHOD, AND STORAGE MEDIUM

(71) Applicant: CANON KABUSHIKI KAISHA, Tokyo (JP)

(72) Inventors: Yusuke Tamura, Kawasaki (JP); Yasunobu Kodama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 210 days.

(21) Appl. No.: 14/138,813

(22) Filed: Dec. 23, 2013

(65) Prior Publication Data

US 2014/0176612 A1    Jun. 26, 2014

(30) Foreign Application Priority Data

Dec. 26, 2012    (JP) .................................. 2012-283671
Dec. 27, 2012    (JP) .................................. 2012-286167
Nov. 12, 2013    (JP) .................................. 2013-234313

(51) Int. Cl.
*G06T 3/40*    (2006.01)
*G06T 11/60*    (2006.01)
(Continued)

(52) U.S. Cl.
CPC ............... *G06T 3/40* (2013.01); *G06T 11/60* (2013.01); *H04N 5/772* (2013.01); *H04N 9/7921* (2013.01); *G06T 2210/22* (2013.01)

(58) Field of Classification Search
CPC .......... G06T 2207/30201; G06T 11/60; G06T 7/0081
See application file for complete search history.

(56) References Cited

U.S. PATENT DOCUMENTS 5,978,519 A    11/1999  Bollman et al.
7,831,901 B1 *  11/2010  Balev .................. G06F 3/04845
                                                    715/209
(Continued)

FOREIGN PATENT DOCUMENTS

EP    1744537 A1    1/2007
GB    2451483 A     2/2009
(Continued)

OTHER PUBLICATIONS

Russian Office Action issued in corresponding application No. 2013157873 dated Sep. 17, 2015.
(Continued)

*Primary Examiner* — Jitesh Patel
(74) *Attorney, Agent, or Firm* — Carter, DeLuca, Farrell & Schmidt, LLP

(57) ABSTRACT

Provided is an image processing apparatus that determines crop positions for an image including a plurality of objects in a preferred manner. This image processing apparatus specifies object regions from the image, and sets a plurality of crop region candidates for each of the specified object regions. The image processing apparatus selects a predetermined number of crop regions from among the plurality of crop region candidates based on evaluation values obtained for the plurality of crop region candidates and on similarities among the plurality of crop region candidates.

9 Claims, 16 Drawing Sheets

(51) Int. Cl.
  *H04N 5/77* (2006.01)
  *H04N 9/79* (2006.01)

(56) References Cited

U.S. PATENT DOCUMENTS

| | | | |
|---|---|---|---|
| 9,070,182 B1* | 6/2015 | Chua | G06T 3/0012 |
| 9,171,404 B1* | 10/2015 | Johnson | G06T 19/006 |
| 2002/0191861 A1* | 12/2002 | Cheatle | G06K 9/38 382/282 |
| 2003/0095709 A1* | 5/2003 | Zhou | G06T 7/0083 382/190 |
| 2003/0113035 A1* | 6/2003 | Cahill | G06T 3/00 382/284 |
| 2004/0264810 A1* | 12/2004 | Taugher | G06F 17/30247 382/305 |
| 2005/0044485 A1 | 2/2005 | Mondry et al. | |
| 2005/0071774 A1* | 3/2005 | Lipsky | G06F 3/0481 715/788 |
| 2006/0103891 A1* | 5/2006 | Atkins | H04N 1/00132 358/450 |
| 2006/0139371 A1* | 6/2006 | Lavine | G06F 3/14 345/620 |
| 2006/0188173 A1* | 8/2006 | Zhang | H04N 7/0122 382/276 |
| 2006/0214953 A1* | 9/2006 | Crew | G06T 3/40 345/660 |
| 2006/0222243 A1* | 10/2006 | Newell | G06K 9/00295 382/173 |
| 2006/0228044 A1* | 10/2006 | Yeh | G06K 9/00463 382/276 |
| 2007/0076979 A1* | 4/2007 | Zhang | G06K 9/00221 382/282 |
| 2008/0037838 A1* | 2/2008 | Ianculescu | G06K 9/00228 382/118 |
| 2008/0082912 A1* | 4/2008 | Atkins | H04N 1/3872 715/243 |
| 2008/0100642 A1* | 5/2008 | Betancourt | G06F 3/04845 345/663 |
| 2008/0181512 A1* | 7/2008 | Gavin | H04N 1/3873 382/209 |
| 2009/0034842 A1 | 2/2009 | Grosvenor | |
| 2009/0142003 A1 | 6/2009 | Fukuda | |
| 2009/0295787 A1* | 12/2009 | Yao | G06T 11/00 345/418 |
| 2010/0073402 A1 | 3/2010 | Delia et al. | |
| 2010/0156931 A1* | 6/2010 | Boreham | G06T 11/60 345/621 |
| 2010/0158325 A1* | 6/2010 | Piramuthu | G06K 9/00234 382/118 |
| 2010/0290705 A1* | 11/2010 | Nakamura | G06T 11/60 382/173 |
| 2010/0299621 A1* | 11/2010 | Piehler | H04N 1/00795 715/764 |
| 2010/0329550 A1 | 12/2010 | Cheatle | |
| 2010/0329588 A1* | 12/2010 | Cheatle | G06K 9/00234 382/298 |
| 2011/0026837 A1 | 2/2011 | Kita | |
| 2011/0206295 A1* | 8/2011 | Tokunaga | H04N 1/3875 382/298 |
| 2011/0242347 A1 | 10/2011 | Kinoshita | |
| 2012/0093418 A1* | 4/2012 | Kim | G06T 11/60 382/195 |
| 2012/0106859 A1* | 5/2012 | Cheatle | G06T 11/60 382/225 |
| 2012/0249838 A1 | 10/2012 | Hiratsuka et al. | |
| 2012/0275704 A1* | 11/2012 | Cok | H04N 1/00196 382/190 |
| 2012/0294514 A1* | 11/2012 | Saunders | H04N 1/00196 382/159 |
| 2013/0108119 A1* | 5/2013 | Ptucha | G06F 17/30247 382/110 |
| 2013/0148880 A1* | 6/2013 | Kennedy | G06T 11/60 382/159 |
| 2013/0176285 A1* | 7/2013 | Sato | G06T 11/60 345/204 |
| 2013/0243320 A1* | 9/2013 | Kopf | G06T 5/005 382/170 |

FOREIGN PATENT DOCUMENTS

| | | |
|---|---|---|
| JP | 2007-019893 A | 1/2007 |
| JP | 2008042800 A | 2/2008 |
| JP | 2009-223764 A | 10/2009 |
| JP | 4625356 B | 2/2011 |
| JP | 2011035633 A | 2/2011 |
| JP | 2011211629 A | 10/2011 |
| JP | 2012119993 A | 6/2012 |
| JP | 2012119994 A | 6/2012 |
| JP | 2012137829 A | 7/2012 |
| JP | 2012217132 A | 11/2012 |
| WO | 2013062775 A1 | 5/2013 |

OTHER PUBLICATIONS

Great Britain office action issued in corresponding application No. 1322770.7 dated Dec. 23, 2015.
Great Britain search report issued in corresponding application No. 1423310.0 dated Dec. 23, 2015.
Li, Congcong et al., Towards Aesthetics: a Photo Quality Assessment and Photo Selection Sytem, Proceedings of the 18th ACM International Conference on Multimedia, ACM, 2010, pp. 827-830, doi:10.1145/1873951.1874089.
Luo, Jiebo, Subject Content-Based Intelligent Cropping of Digital Photos, 2007 IEEE International Conference on Multimedia and Expo., IEEE, 2007, pp. 2218-2221, doi: 10.1109/ICME2007. 4285126.
Zhang, Mingju et al., Auto Cropping for Digital Photographs, 2005 IEEE International Conference on Multimedia and Expo., IEEE, 2005, 4 pages, doi: 10.1109/ICME.2005.1521454.
German Office Action issued in connection with German Application No. 102013226164.0 dated Aug. 16, 2016 (6 pages).
Japanese Office Action issued in connection with Japanese Patent Application No. 2015-242632 dated Aug. 1, 2016 (3 pages).
United Kingdom Search Report issued in corresponding application No. 1322770.7 dated Jun. 23, 2014.
Chinese Office Action issued in connection with Chinese Patent Application No. 201310740104.1 dated Jul. 29, 2016 (26 pages).
United Kingdom Examination Report and Search report dated Jun. 19, 2017 in corresponding United Kingdom Patent Application No. GB1423310.0, 6 pages.

* cited by examiner

FIG. 3

|   | ASPECT RATIO | SIZE |
|---|---|---|
| 1 | 4:3 | 4000×3000 |
| 2 | | 2816×2112 |
| 3 | | 1600×1200 |
| 4 | 16:9 | 4000×2248 |
| 5 | | 2816×1584 |
| 6 | | 1920×1080 |
| 7 | 1:1 | 2992×2992 |
| 8 | | 2112×2112 |
| 9 | | 1200×1200 |
| 10 | 3:4 | 2112×2816 |
| 11 | | 1200×1600 |
| 12 | 9:16 | 1584×2816 |
| 13 | | 1080×1920 |

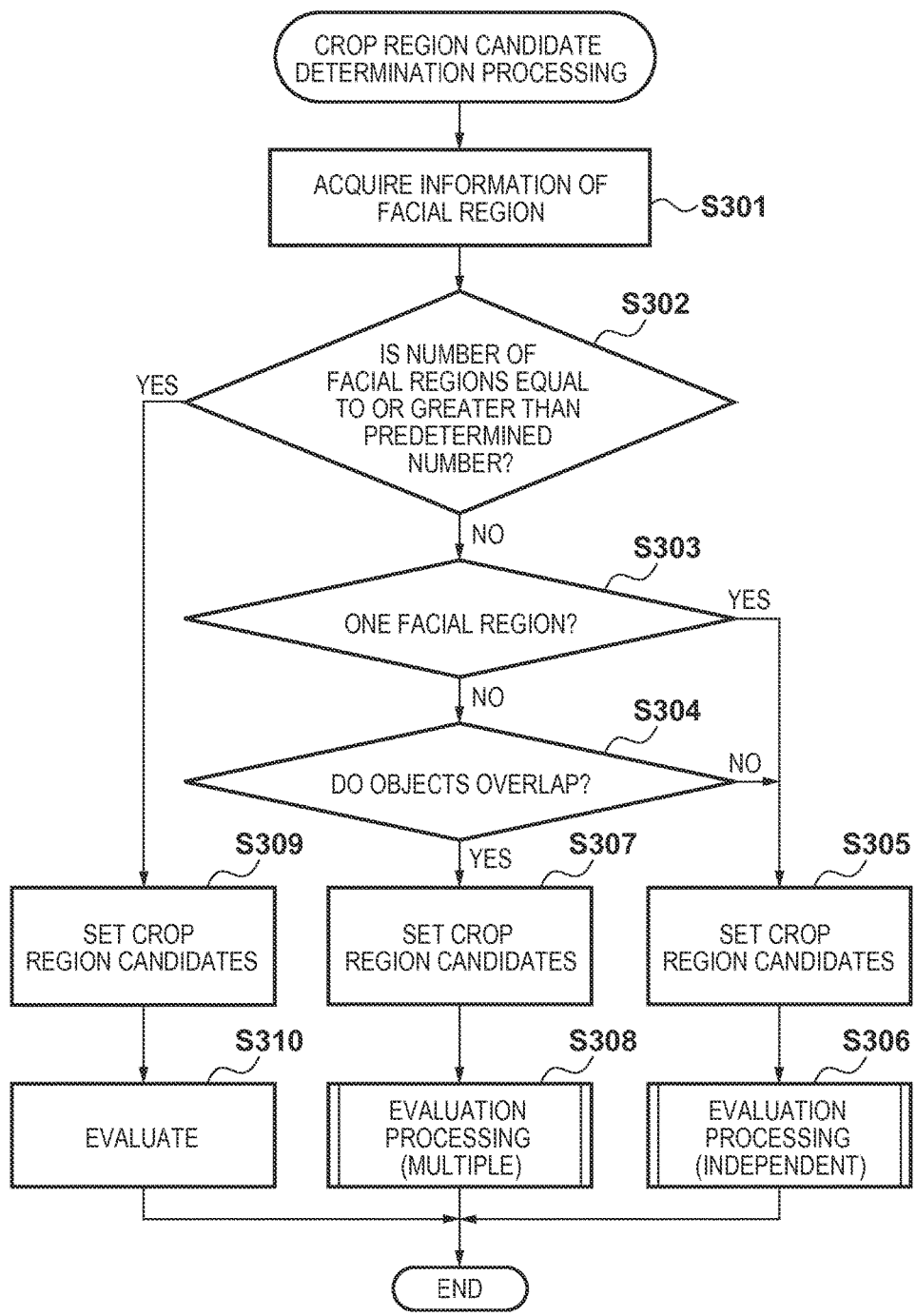

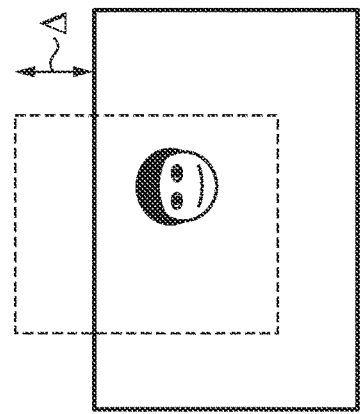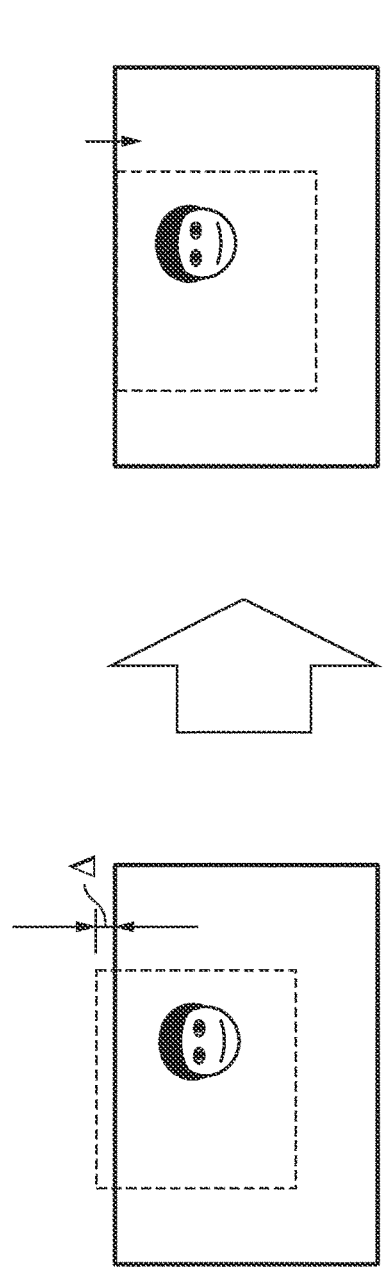

FIG. 12
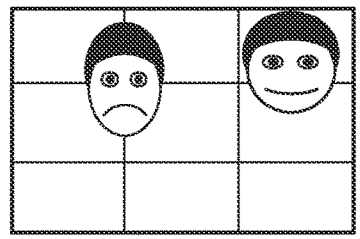
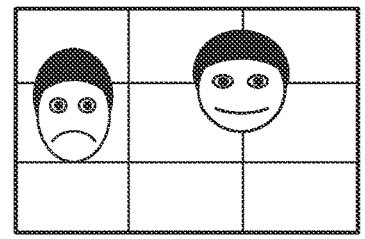
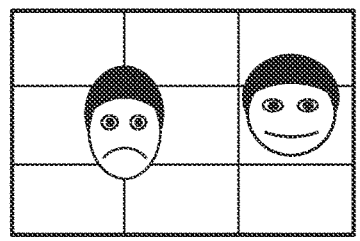
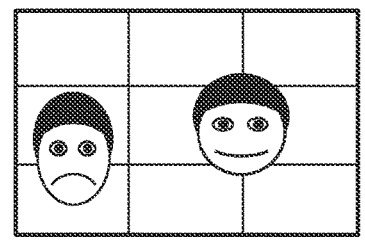
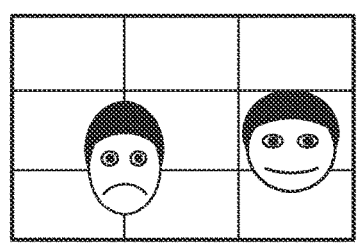
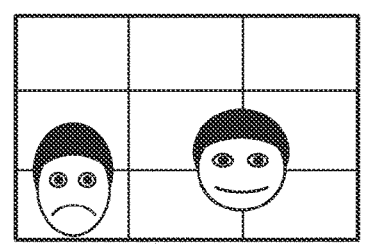

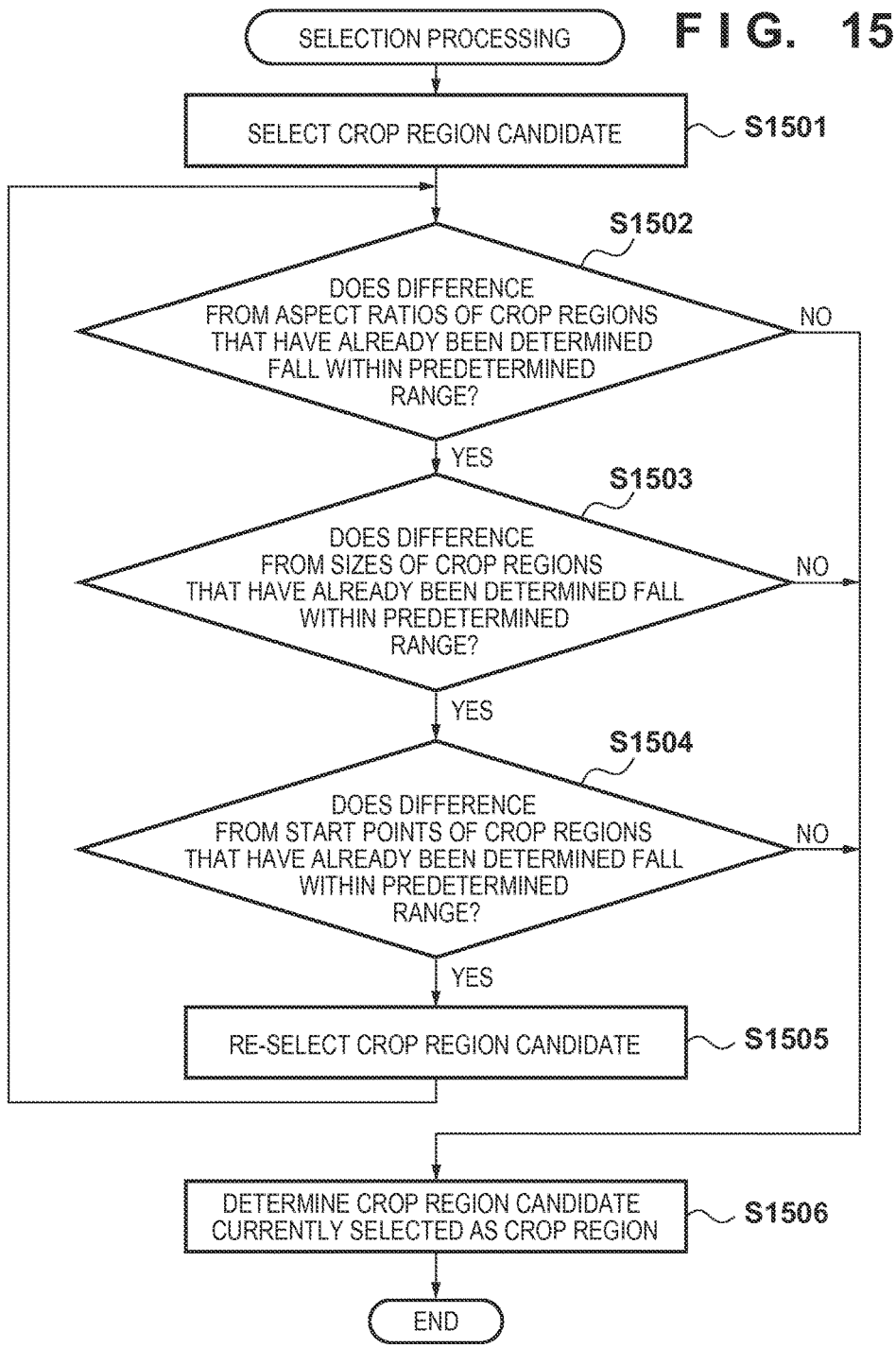

IMAGE PROCESSING APPARATUS, IMAGE CAPTURING APPARATUS, IMAGE PROCESSING METHOD, AND STORAGE MEDIUM

BACKGROUND OF THE INVENTION

Field of the Invention

The present invention relates to an image processing apparatus, an image capturing apparatus, an image processing method and a storage medium, and particularly to an image cropping technique.

Description of the Related Art

In recent years, a specific object, such as a person, is detected from an image not only by using image capturing apparatuses such as digital cameras, but also by using image management applications and the like. Japanese Patent No. 4625356 discloses a technique to crop an image in accordance with a specific object that has been detected.

According to this Japanese Patent No. 4625356, a crop position is determined such that one object is located at a predetermined position in a cropped image. However, using the method disclosed in Japanese Patent No. 4625356 for an image including a plurality of objects may result in execution of the following undesired cropping.

For example, assume the case where preferred framing of a cropped image is set such that an object exists on straight lines that trisect the cropped image in the horizontal direction. In the case where only one person (object) 1201 exists in an image 1200 as shown in FIG. 16A, a resultant cropped image 1202 matches the set preferred framing. On the other hand, assume the case where two people exist in an image 1210 as shown in FIG. 16B. In this case, if the image is cropped so as to incorporate a person 1211 into the preferred framing, a part of a person 1212 may not be incorporated into the preferred framing as shown in a resultant cropped image 1213.

Meanwhile, Japanese Patent Laid-Open No. 2007-19893 discloses a technique to set a plurality of crop regions for an image in accordance with predetermined conditions that have been preset, and to generate a plurality of crop images from this image based on the set crop regions.

However, if crop images are generated in accordance with a plurality of crop regions that have been set as described in Japanese Patent Laid-Open No. 2007-19893, a plurality of similar crop images may be generated.

SUMMARY OF THE INVENTION

The present invention was made in view of such problems in the conventional technique. The present invention provides an image processing apparatus, an image capturing apparatus, an image processing method and a storage medium that generate preferred crop images.

The present invention in its first aspect provides an image processing apparatus comprising: a specifying unit which is able to specify object regions from an image; a setting unit which is able to set a plurality of crop region candidates for each of the object regions specified by the specifying unit; an evaluating unit which is able to obtain evaluation values of the plurality of crop region candidates set by the setting unit; and a selecting unit which is able to select a predetermined number of crop regions from among the plurality of crop region candidates, wherein the selecting unit selects the predetermined number of crop regions based on similarities among the plurality of crop region candidates and on the evaluation values of the plurality of crop region candidates.

The present invention in its second aspect provides an image processing apparatus comprising: a specifying unit which is able to specify object regions from an image; and a setting unit which is able to set a plurality of crop region candidates for each of the object regions specified by the specifying unit, wherein the setting unit sets the crop region candidates such that the object regions are arranged in predetermined positions in the crop region candidates, and varies the predetermined positions depending on at least one of the number, sizes, types, and arrangements of the object regions specified by the specifying unit.

The present invention in its third aspect provides an image processing method comprising: a specifying step of specifying object regions from an image; a setting step of setting a plurality of crop region candidates for each of the object regions specified in the specifying step; an evaluating step for obtaining evaluation values of the plurality of crop region candidates set in the setting step; and a selecting step of selecting a predetermined number of crop regions from among the plurality of crop region candidates, wherein the selecting step selects the crop regions based on similarities among the plurality of crop region candidates and on the evaluation values of the plurality of crop region candidates.

The present invention in its fourth aspect provides an image processing method comprising: a specifying step of specifying object regions from an image; and a setting step of setting a plurality of crop region candidates for each of the object regions specified in the specifying step, wherein the setting step sets the crop region candidates such that the object regions are arranged in predetermined positions in the crop region candidates, and varies the predetermined positions depending on at least one of the number, sizes, types, and arrangements of the object regions specified in the specifying step.

Further features of the present invention will become apparent from the following description of exemplary embodiments (with reference to the attached drawings).

BRIEF DESCRIPTION OF THE DRAWINGS

FIG. 3 shows examples of aspect ratios and sizes of crop region candidates.

FIG. 6 is a flowchart showing an example of crop region candidate determination processing.

FIG. 10A shows an example in which a protrusion amount of a target object region candidate outside a target image is large, and FIG. 10B shows an example in which a protrusion amount of a target object region candidate outside a target image is small.

FIG. 12 shows diagrams for describing preferred arrangements of a facial region in multiple cropping.

FIG. 15 is a flowchart showing an example of processing for selecting a crop region for each object region.

DESCRIPTION OF THE EMBODIMENTS

Embodiment

An illustrative embodiment of the present invention will now be described in detail with reference to the drawings. It should be noted that, in one embodiment described below, the present invention is applied to a digital camera capable of generating an image by cropping an arbitrary region from a target image, the digital camera serving as one example of an image processing apparatus. However, the present invention is applicable to any apparatus capable of setting a crop region for a target image.

<<Configuration of Digital Camera 100>>

Figure 1:
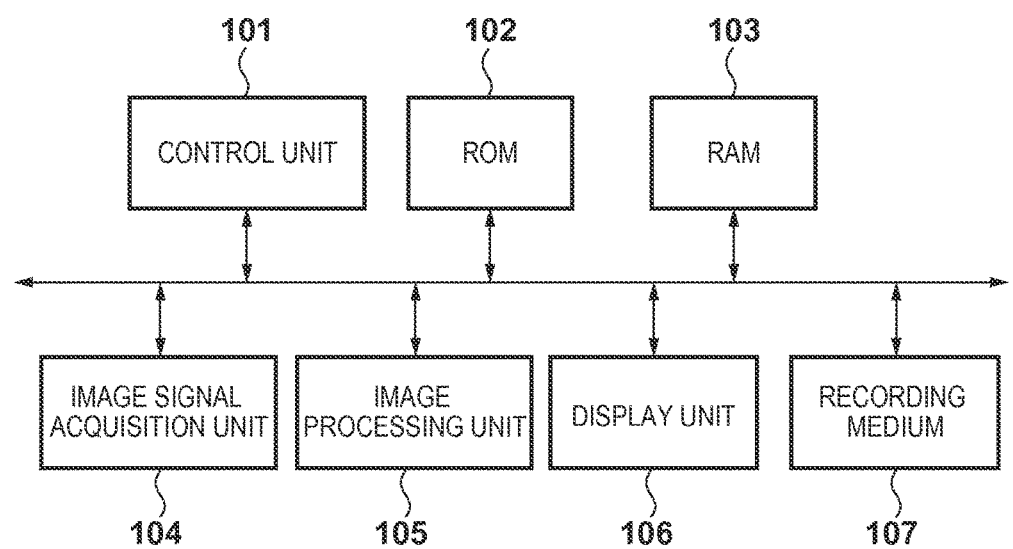
FIG. 1 is a block diagram showing a functional configuration of a digital camera 100 according to an embodiment of the present invention.

FIG. 1 is a block diagram showing a functional configuration of a digital camera 100 according to the embodiment of the present invention.

A control unit 101 is, for example, a CPU and controls the operations of blocks included in the digital camera 100. More specifically, the control unit 101 controls the operations of the blocks by reading operation programs for the blocks stored in a ROM 102, loading the read operation programs to a RAM 103, and executing the operation programs.

The ROM 102 is, for example, a rewritable non-volatile memory. The ROM 102 stores information of parameters and the like necessary for the operations of the blocks, in addition to the operation programs for the blocks included in the digital camera 100. The RAM 103 is a volatile memory. The RAM 103 is used not only as an area to which the operation programs of the blocks are loaded, but also as a storage area for temporarily storing intermediate data output in the operations of the blocks.

An image signal acquisition unit 104 outputs digital image signals. The image signal acquisition unit 104 is, for example, an image sensor such as a CCD or a CMOS sensor. The image signal acquisition unit 104 acquires analog image signals by photo-electrically converting an optical image that is formed on an imaging surface by an optical system, which is not shown in the drawings, through image capture. The image signal acquisition unit 104 also applies predetermined image processing, such as sampling processing, gain adjustment processing and A/D conversion processing, to the acquired analog image signals, and outputs digital image signals. The image signal acquisition unit 104 may be configured to receive and output any image signal via an external recording medium and a network.

An image processing unit 105 applies image processing, such as color conversion processing and enlargement/reduction processing, to the digital image signals (hereinafter simply referred to as an image). The image processing unit 105 also executes crop processing for extracting an arbitrary region from an input image.

<Specific Configuration of Image Processing Unit 105>

Figure 2:
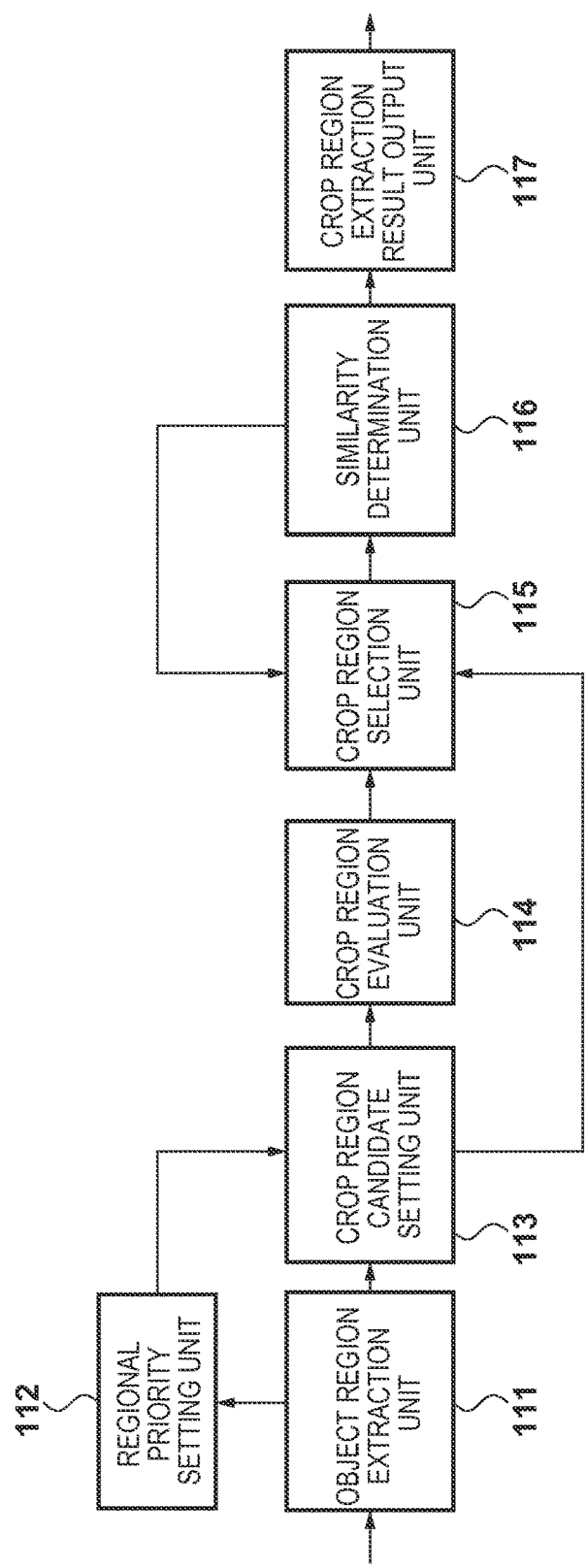
FIG. 2 is a block diagram showing an internal configuration used for crop processing executed by an image processing unit 105.

With reference to FIG. 2, the following provides a further description of a functional configuration of a processing line associated with crop processing executed by the image processing unit 105 in the present embodiment.

An object region extraction unit 111 detects an object region corresponding to a specific object included in an input image (target). In the following description of the present embodiment, the object region extraction unit 111 detects a facial region corresponding to a face of a person included in a target image as an object region. However, embodiments of the present invention are not limited in this way. For example, types of an object region may include a face of an animal other than a person, and an object having an external appearance with a specific pattern. Furthermore, in the following description of the present embodiment, the object region extraction unit 111 detects an object region from a luminance image corresponding to a target image input to the image processing unit 105. However, an object region is not limited to being detected from a luminance image. Alternatively, an object region may be detected from color difference signals corresponding to a target image. For example, the object region extraction unit 111 outputs information of the central coordinates of a detected facial region in a target image and the size of the detected facial region as a result of detection of an object region.

Furthermore, if a facial region cannot be detected from an input image, the object region extraction unit 111 divides the image into a plurality of blocks and obtains hue of each block in order to detect an object other than a facial region. Then, regions grouped by hue are extracted by combining adjacent blocks with similar hues as the same object. Thereafter, out of these regions grouped by hue, regions that do not adjoin the edges of the image and have a size equal to or larger than a predetermined size are set and output as candidates for an object region (object region candidates).

When the object region extraction unit 111 has set a plurality of object region candidates that are not facial regions, a regional priority setting unit 112 performs calculation to determine regional priority orders with respect to the plurality of detected object region candidates. The regional priority setting unit 112 calculates evaluation values of the object region candidates based on, for example, the positions, sizes, and distance information of the object region candidates in the image, and sets a higher priority order for a region with a greater evaluation value calculated. For example, if the evaluation values are calculated based on the positions, the closer the barycentric coordinates of an object region candidate are to the central coordinates of the image, the higher a position-based evaluation value is. A region candidate with an evaluation value not less than a threshold and with a priority order within a predetermined range (for example, the highest or the second highest priority order) is determined as an object region. This method for setting the priorities for regions will be described later with reference to FIG. 4.

A crop region candidate setting unit 113 sets crop region candidates, which are candidates for regions to be cut out in crop processing. The image processing unit 105 according to the present embodiment executes crop processing to cut out, from a target image acquired through image capture, images of regions That each exhibit framing in which an object region is arranged in a preferred manner. For this reason, the crop region candidate setting unit 113 sets, for each of the object regions detected by the object region extraction unit 111, a plurality of crop region candidates that satisfy conditions regarding the arrangement of the object region. Alternatively, the crop region candidate setting unit 113 may determine object regions from the object region candidates set by the object region extraction unit 111 based on information of evaluation values and priority orders supplied from the regional priority setting unit 112, and set a plurality of crop region candidates for each of the determined object regions. In the present embodiment, the crop region candidate setting unit 113 sets rectangular regions of the aspect ratios and sizes (number of pixels) shown in FIG. 3 as crop region candidates.

A crop region evaluation unit 114 calculates an evaluation value for each of the crop region candidates set by the crop region candidate setting unit 113, on the basis of the positions of the object regions in the crop region candidates. A method for calculating the evaluation values of crop region candidates in the crop region evaluation unit 114 will be elaborated later in a description of processing for determining a crop region.

A crop region selection unit 115 selects a crop region from among the crop region candidates set by the crop region candidate setting unit 113 on the basis of the evaluation values calculated by the crop region evaluation unit 114. For example, in the case where one crop image is to be generated from one image, the crop region selection unit 115 selects a crop region candidate for which the crop region evaluation unit 114 calculated the highest evaluation value as a crop region. On the other hand, in the case where a plurality of crop images are to be generated from one image, the crop region selection unit 115 determines crop regions corresponding in number to the crop images to be generated out of the plurality of crop region candidates in cooperation with a later-described similarity determination unit 116.

In the case where a plurality of crop images are to be generated from one image, the similarity determination unit 116 determines similarities of the crop region candidates and returns the result of determination to the crop region selection unit 115, so as to prevent the crop region selection unit 115 from selecting crop regions with similar framing. For example, the similarity determination unit 116 successively receives the crop region candidates from the crop region selection unit 115 in order from the highest evaluation value, and determines similarity between each received candidate and crop regions that have already been determined. If the result of determination indicates similarity, the crop region selection unit 115 does not set the corresponding crop region candidate as a crop region, and omits the same from the candidates. On the other hand, if the result of determination does not indicate similarity, the crop region selection unit 115 sets the corresponding crop region candidate as a crop region. Until the number of crop region candidates that have been selected as crop regions reaches the number of crop images to be output, the crop region selection unit 115 repeatedly outputs crop region candidates for determination of similarities by the similarity determination unit 116, and repeatedly performs selection/determination based on similarities. A method for determining similarities and crop regions will be described later with reference to FIG. 15.

It should be noted that, in the case where one crop image is to be generated from one image, the crop region selection unit 115 should select only one crop region, and therefore the processing of the similarity determination unit 116 need not be executed.

A crop region extraction result output unit 117 generates a crop image by cropping the target image based on information of a crop region selected by the crop region selection unit 115, or on information of a region that was determined by the similarity determination unit 116 as a final crop region, and then outputs the generated crop image.

A display unit 106 of the digital camera 100 is a display device, such as an LCD, provided in the digital camera 100. The display unit 106 displays, for example, images acquired through image capture performed by the image signal acquisition unit 104 and through crop processing executed by the image processing unit 105, or images recorded in a recording medium 107.

The recording medium 107 is a recording device, such as a build-in memory provided in the digital camera 100, or a recording device that is connected to the digital camera 100 in an attachable/detachable manner, such as a memory card and an HDD. Images acquired through image capture performed by the image signal acquisition unit 104 and through crop processing executed by the image processing unit 105 are recorded in the recording medium 107.

While the present embodiment is described under the assumption that the blocks included in the digital camera 100 as hardware realize processing, embodiments of the present invention are not limited in this way; alternatively, processing of the blocks may be realized by programs executing similar processing.

<Processing for Setting Regional Priorities>

Figure 4:
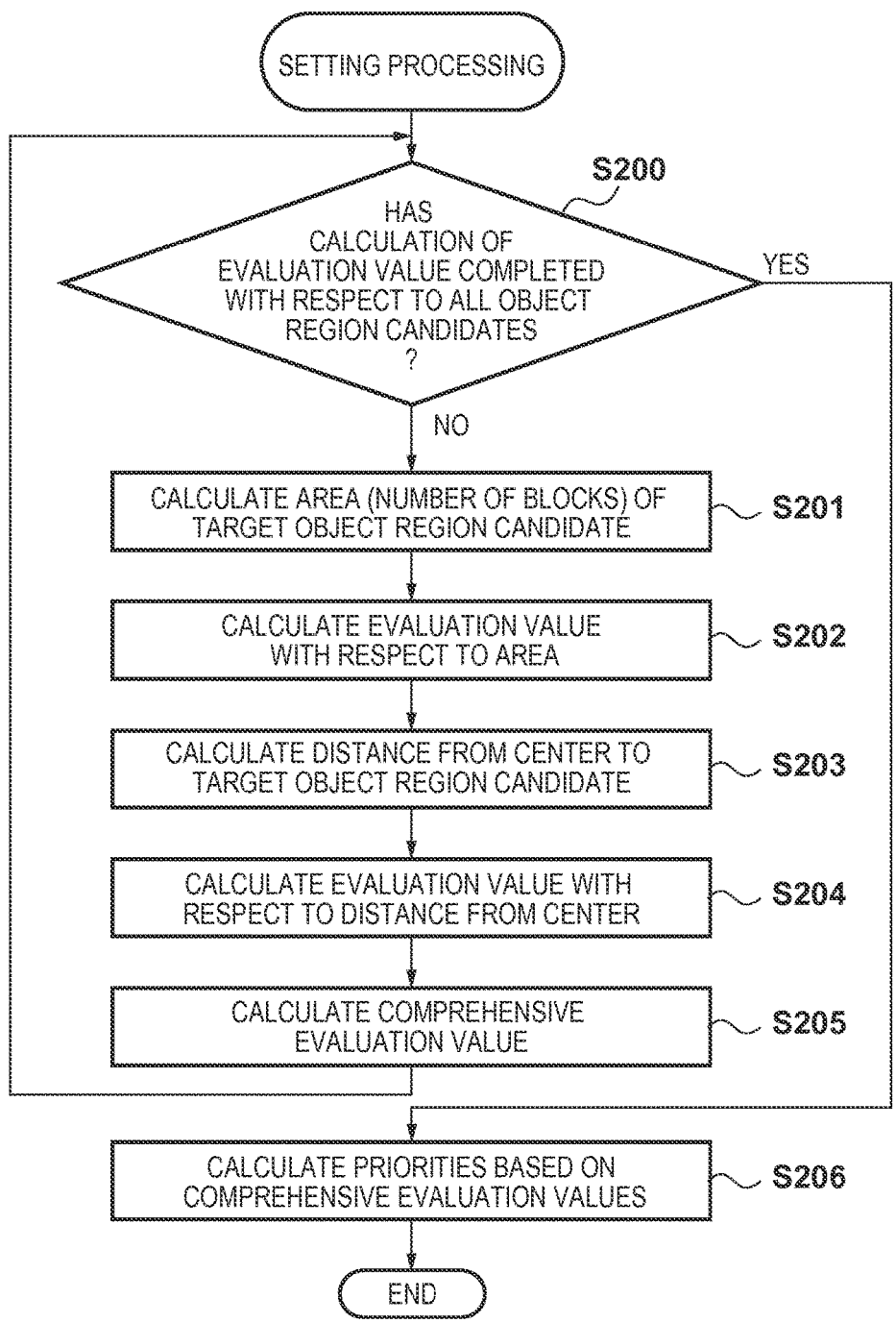
FIG. 4 is a flowchart showing an example of processing for setting priorities of object region candidates.

With reference to a flowchart of FIG. 4, the following describes specific processing related to a method for setting priorities to a plurality of candidates for object regions (object region candidates) in the regional priority setting unit 112. It should be noted that the present flowchart is started when, for example, the object region extraction unit 111 has not detected a facial region and therefore has set a plurality of object region candidates based on hues.

First, in step S200, the regional priority setting unit 112 determines whether or not calculation of a comprehensive evaluation value has been completed with respect to all of the detected object region candidates. The regional priority setting unit 112 proceeds to the process of step S201 if the calculation has not been completed, and to the process of step S206 if the calculation has been completed.

Figure 5A:
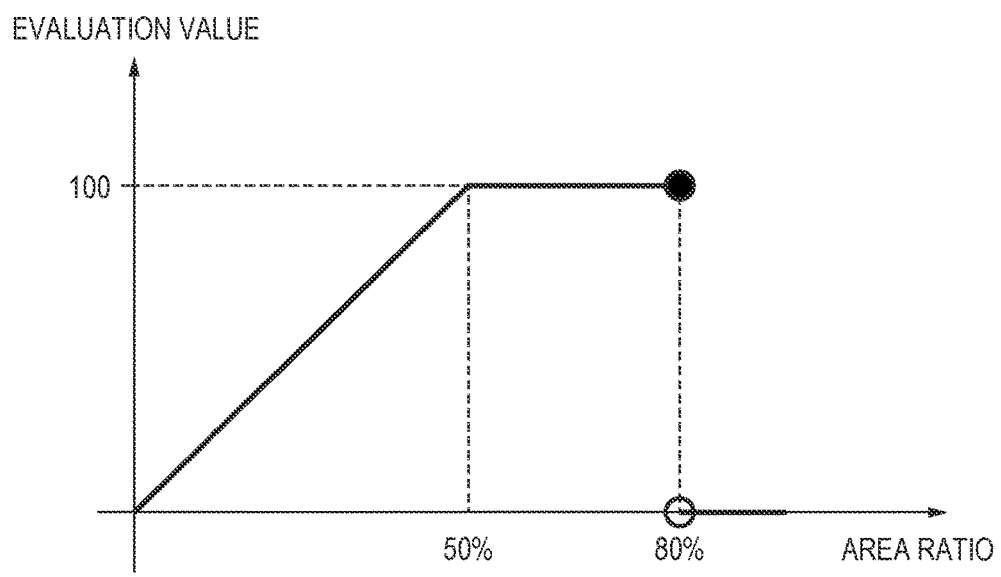
FIG. 5A shows an example of calculation of an evaluation value corresponding to an area of an object region candidate.

In step S201, the regional priority setting unit 112 selects, from among the detected object region candidates, an object region candidate (target object region candidate) for which the comprehensive evaluation value has not been calculated yet, and acquires the area of the target object region candidate. In the present embodiment, the regional priority setting unit 112 acquires the number of blocks used in setting the target object region candidate as the area. Next, based on the number of blocks acquired in step S201, the regional priority setting unit 112 calculates an evaluation value with respect to the area of the target object region candidate (step S202). FIG. 5A shows an example of calculation of an evaluation value with respect to the area of a target object region candidate. More specifically, FIG. 5A shows a relationship between a ratio of the area of a target object region candidate to the entire image, that is to say, a ratio of the number of blocks associated with a target object region candidate to the total number of blocks, and an evaluation value with respect to the area. As shown in FIG. 5A, it is sufficient to set an evaluation value with respect to the area of a target object region candidate such that the larger the area of the target object region candidate, the higher the evaluation value.

Figure 5B:
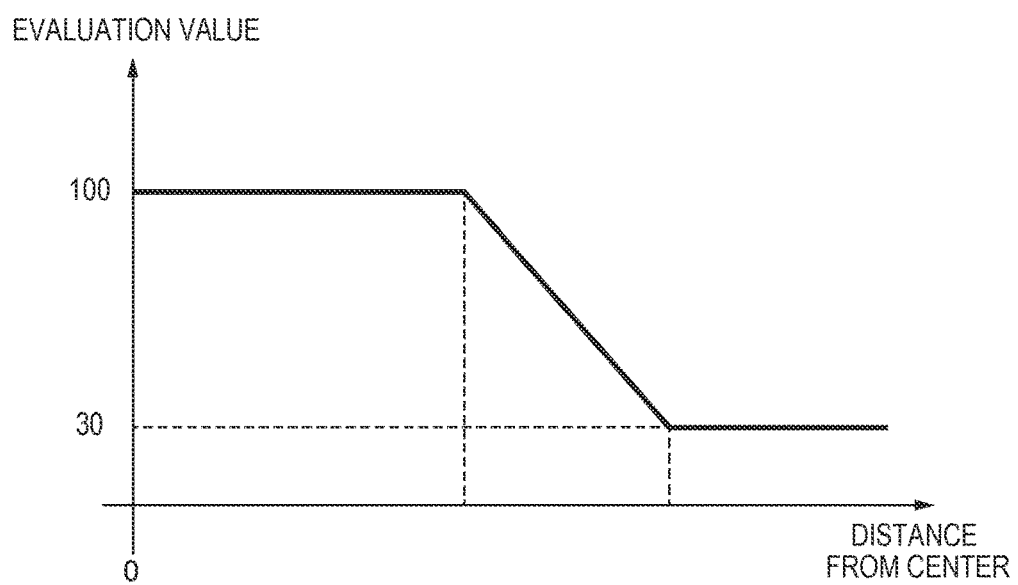
FIG. 5B shows an example of calculation of an evaluation value corresponding to a distance from the center of an image to an object region candidate.

Thereafter, in step S203, the regional priority setting unit 112 calculates a distance from the center of the image to the target object region candidate. More specifically, the regional priority setting unit 112 first calculates distances from the center of the image to the blocks constituting the target object region candidate. Then, an average value of the calculated distances from the center of the image to all the blocks constituting the target object region candidate is used as the distance from the center of the image to the target object region candidate. Next, in step S204, based on the distance from the center of the image calculated in step S203, the regional priority setting unit 112 calculates an evaluation value with respect to the distance from the center of the image so the target object region candidate. FIG. 5B shows an example of calculation of an evaluation value with respect to a distance from the center of an image. As shown in FIG. 5B, it is sufficient to set an evaluation value with respect to a distance from the center of an image to a target object region candidate such that the larger the distance from the center of the image to the target object region candidate, the smaller the evaluation value.

Subsequently, in step S205, the regional priority setting unit 112 calculates a comprehensive evaluation value of the target object region candidate based on the two types of evaluation values calculated in steps S202 and S204. It is sufficient to calculate the comprehensive evaluation value by, for example, multiplying the two types of evaluation values calculated in steps S202 and S204. After the process of step S205, the regional priority setting unit 112 returns to the process of S200 and determines again whether or not the calculation of the comprehensive evaluation value has been completed for all of the object region candidates, and if the calculation has not been completed, repeats the above-described processes for the next object region candidate.

If the calculation of the comprehensive evaluation value has been completed for all of the object region candidates (the YES branch of step S200), the regional priority setting unit 112 allocates priority orders to the object region candidates in order from the highest comprehensive evaluation value in step S206.

<<Crop Region Candidate Determination Processing>>

With reference to a flowchart of FIG. 6, the following describes specifics of crop region candidate determination processing that is executed in the case where the object region extraction unit 111 has output facial regions as object regions. The processing corresponding to this flowchart is realized by the crop region candidate setting unit 113 and by the crop region evaluation unit 114 under control by the control unit 101. It should be noted that the present crop region candidate determination processing will be described under the assumption that it is started when, for example, the object region extraction unit 111 detects an object region after a target image has been set to which automatic crop processing is to be applied. It will be also assumed that, in the present crop region candidate determination processing, at least one facial region is included in the target image.

In step S301, the crop region candidate setting unit 113 acquires information of the position and size of a facial region (object region) detected by the object region extraction unit 111.

In step S302, the crop region candidate setting unit 113 determines whether or not the number of facial regions included in the target image is equal to or greater than a predetermined number. In the digital camera 100 according to the present embodiment, if the number of facial regions included in the target image is equal to or greater than the predetermined number, the crop region candidate setting unit 113 determines that the target image is a group photograph. That is to say, in the case of a group photograph, even if a crop region (framing) is determined so as to arrange one facial region in a preferred position in a cropped image, there could be a large number of facial regions that are not arranged in preferred positions. For this reason, in the present embodiment, if it is determined that a group photograph has been captured, that is to say, if the number of facial regions included in a target image is equal to or greater than the predetermined number, the crop region candidate setting unit 113 does not determine a crop region on the basis of the arrangement of one facial region.

While the present embodiment is described under the assumption that a captured target image is determined to be a group photograph if the number of facial regions included in the target image is equal to or greater than the predetermined number, whether or not the target image is a group photograph may be determined based on a combination of the size of facial regions and other conditions. For example, if a captured target image includes an irrelevant person who showed up during image capture, it is inappropriate to determine a facial region of this person as an object of a group photograph. In view of this, for example, a range may be set for the size of a facial region, and only facial regions with a size falling within the set range may be counted towards facial regions that are used in determining whether or not the target image is a group photograph.

The crop region candidate setting unit 113 proceeds to the process of step S309 if it determines that the number of facial regions included in the target image is equal to or greater than the predetermined number, and proceeds to the process of step S303 if it determines that the number of facial regions included in the target image is smaller than the predetermined number.

In step S303, the crop region candidate setting unit 113 determines whether or not only one facial region is included in the target image. In the present embodiment, the crop region evaluation unit 114 uses different evaluation methods depending on whether or not to include a plurality of facial regions in a crop region candidate set or crop processing. For this reason, in the present step, the crop region candidate setting unit 113 uses an evaluation method that applies to a condition that the number of facial regions that can be included in a crop region candidate is one for certain. The crop region candidate setting unit 113 proceeds to the process of step S305 if it determines that only one facial region is included in the target image, and proceeds to the process of step S304 if it determines that a plurality of facial regions are included in the target image.

In step S304, the crop region candidate setting unit 113 determines the arrangements of the plurality of objects, more specifically, whether or not captured objects corresponding to the facial regions overlap in the target image. To be more precise, the control unit 101 estimates, for the objects corresponding to the detected facial regions, regions of bodies (body regions) that are presumed to be adjacent to the lower edges of the detected facial regions, and determines whether or not these body regions overlap body regions or facial regions of other objects at a predetermined ratio or more.

Figure 7A:
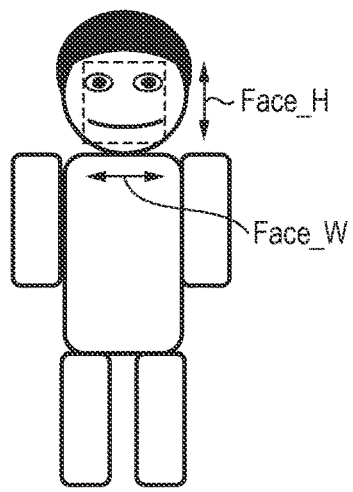
FIG. 7A shows a size of a facial region.
Figure 7B:
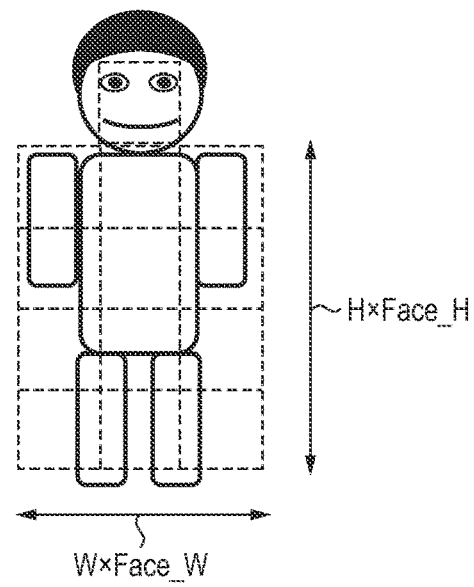
FIG. 7B shows a size of a body region estimated from a size of a facial region.
Figure 7C:
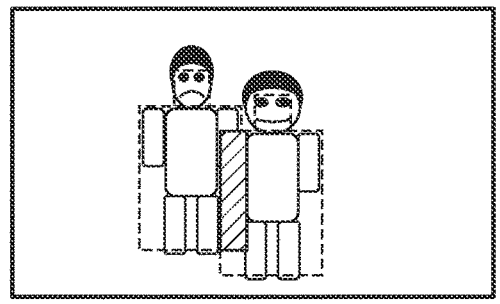
FIG. 7C shows an example in which at least one of a facial region and a body region of an object of interest overlaps a facial region or a body region of another object.
Figure 7D:
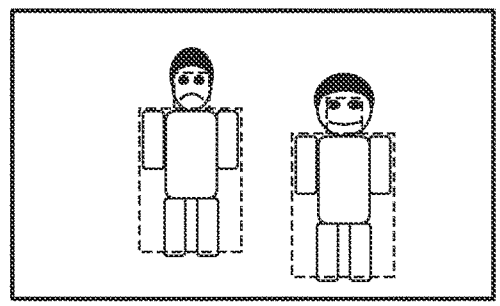
FIG. 7D shows an example in which at least one of a facial region and a body region of an object of interest does not overlap a facial region or a body region of another object.

For example, in the case of a facial region shown in FIG. 7A, it is sufficient to estimate a body region by multiplying the width and height of the facial region by preset coefficients as shown in FIG. 7B. If at least one of a facial region and a body region of an object of interest overlaps a facial region or a body region of another object as shown in FIG. 7C, the crop region candidate setting unit 113 determines that these facial regions should not be separated into different crop region candidates. On the other hand, if neither a facial region nor a body region of an object of interest overlaps a facial region or a body region of another object as shown in FIG. 7D, it is determined that preferred framing is achieved by separating the facial regions corresponding to these objects into different crop region candidates.

While the method for setting a body region has been described in the present embodiment under the assumption that a body is adjacent to the lower edge of a facial region, the present embodiment is not limited in this way. For example, a body region may be set in accordance with the orientation of a face calculated from a facial region. Alternatively, if the digital camera 100 is capable of detecting the direction of gravity, a body region may be set under the assumption that it exists vertically below a facial region. Alternatively, whether or not captured objects overlap in a target image may be determined based on the distance between facial regions without obtaining body regions.

The crop region candidate setting unit 113 proceeds to the process of step S307 if it determines that captured objects corresponding to facial regions overlap in the target image, and proceeds to the process of step S305 if it determines that captured objects corresponding to facial regions do not overlap in the target image. It should be noted that the process of the present step may be executed for each facial region detected. More specifically, control may be performed such that the crop region candidate setting unit 113 applies the evaluation processing in step S305 only to a facial region that has been determined to overlap none of the other objects corresponding to facial regions included in the target image. In this case, it is sufficient for the control unit 101 to perform control such that the evaluation processing in step S307 is applied to a facial region that has been determined to overlap any of the other objects corresponding to facial regions.

Figure 8:
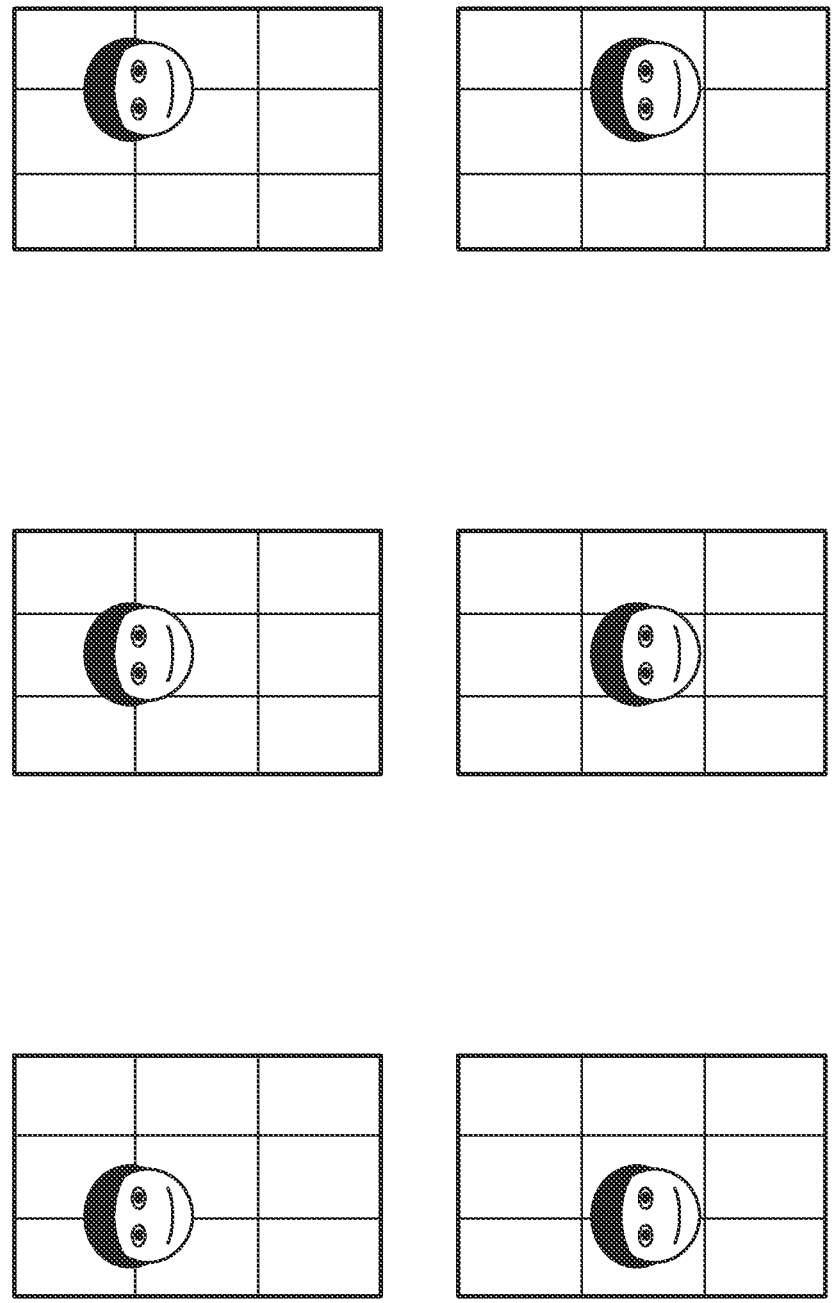
FIG. 8 shows diagrams for describing preferred arrangements of a facial region of interest in independent cropping.

In step S305, the crop region candidate setting unit 113 sets crop region candidates for a facial region that is to be cropped independently from the target image. More specifically, the crop region candidate setting unit 113 sequentially selects facial regions (facial regions of interest) that are to be cropped independently, and sets a plurality of patterns of crop region candidates for each of the selected facial regions. The crop region candidate setting unit 113 sets each crop region candidate such that a facial region of interest is arranged in a preset position in the set crop region candidate. In the present embodiment, as shown in FIG. 8, six types of crop region candidates are set in which a facial region of interest is positioned on the basis of line segments that trisect she crop region candidates in the horizontal and vertical directions so as to achieve framing that is experimentally considered preferred. As mentioned earlier, crop region candidates that are set by the crop region candidate setting unit 113 according to the present embodiment are rectangular regions conforming to five types of aspect ratios and three sizes for each aspect ratio. Therefore, 5×3×6=90 types of crop region candidates are set for one facial region of interest. It should be noted that the aforementioned six types of framing are merely illustrative, and other types of framing may be used, such as framing is which a facial region is arranged at the center, and framing in which a facial region is arranged at the upper center.

In step S306, the crop region evaluation unit 114 applies evaluation processing for independent cropping to all of the crop region candidates set in step S305 so as to acquire evaluation values of the crop region candidates.

<Evaluation Processing (Independent)>

Figure 9:
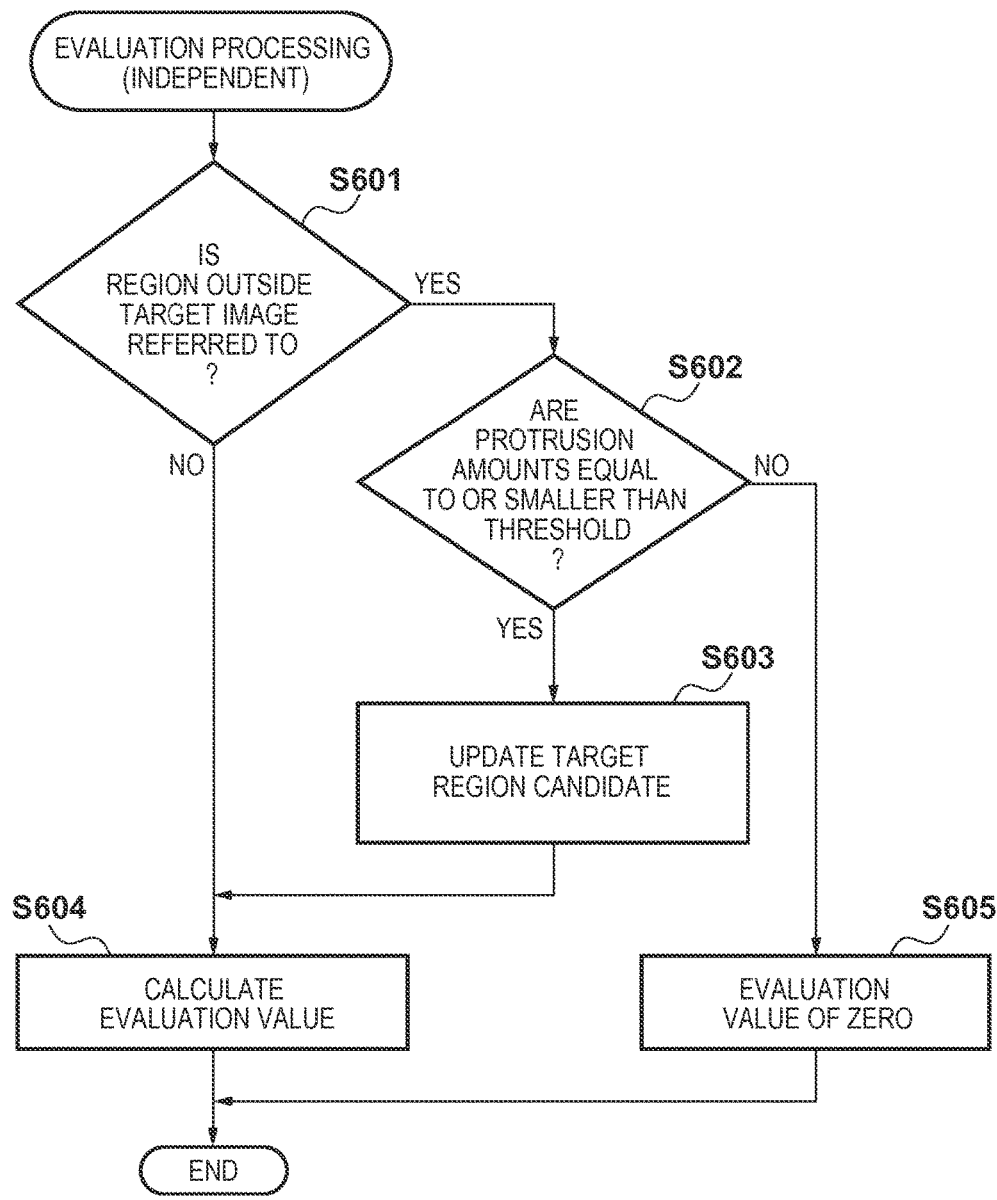
FIG. 9 is a flowchart showing an example of evaluation processing for independent cropping.

With reference to a flowchart of FIG. 9, the following describes specifics of evaluation processing for independent cropping executed in the present step. In the following description, a crop region candidate targeted for the present evaluation processing is referred to as a "target region candidate".

In step S601, the crop region evaluation unit 114 determines whether or not a part of a target region candidate refers to a region outside the target image. More specifically, as shown in FIG. 10A, the crop region evaluation unit 114 determines in the present step whether or not a target region candidate indicated by a dashed line incorporates a region that protrudes outside the range of the target image indicated by a solid line into a crop region. If the crop region evaluation unit 114 determines that the target region candidate refers to a region outside the target image, the control unit 101 proceeds to the process of step S602. If the crop region evaluation unit 114 determines that the target region candidate refers to a region inside the target image, the control unit 101 proceeds to the process of step S604.

In step S602, the crop region evaluation unit 114 determines whether or not the amounts by which the target region candidate protrudes outside the target image are equal to or smaller than a preset threshold. In the present step, the crop region evaluation unit 114 acquires the amounts by which the target region candidate protrudes outside the target image (protrusion amount) with respect to the horizontal and vertical directions, and determines whether or not the protrusion amounts are equal to or smaller than a threshold that allows fine adjustment of the target region candidate. In the example of FIG. 10A, as the target region candidate protrudes outside the target image only in the vertical direction, the determination is made on the basis of the protrusion amount Δ thereof in the vertical direction. The control unit 101 proceeds to the process of step S603 if the crop region evaluation unit 114 determines that the protrusion amounts are smaller than or equal to the preset threshold, and to the process of step S605 if it determines that the protrusion amounts exceed the preset threshold.

In step S603, under control by the control unit 101, the crop region candidate setting unit 113 updates a reference range in accordance with information of the protrusion amounts acquired in step S602, such that the target region candidate fits inside the target image. For example, if a protrusion amount Δ is equal to or smaller than the threshold that allows fine adjustment as shown in FIG. 10B, it is sufficient to update the target region candidate by translating the target region candidate only by Δ in the direction of protrusion, that is to say, the vertical direction.

In step S604, the crop region evaluation unit 114 calculates an evaluation value of the target region candidate. In the present embodiment, an evaluation value E of a crop region candidate is calculated by multiplying the following four values ($E_1$, $E_2$, $E_3$, $E_4$).

1. Evaluation value. $E_1$, which is determined with respect to a ratio of the area of a facial region of interest in the target region candidate.

2. Evaluation value $E_2$, which is determined with respect to the arrangement position of the facial region of interest.

3. Evaluation value $E_3$, which is determined with respect to an aspect ratio.

4. Random value $E_4$, which suppresses a bias in the evaluation result.

Figure 11A:
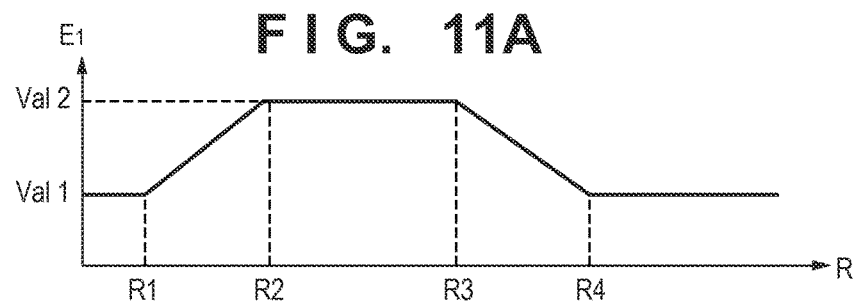
FIGS. 11A, 11B and 11C show diagrams for describing methods for calculating an evaluation value in evaluation processing for independent cropping.

For example, as shown in FIG. 11A, a value in a range of Val 1 to Val 2 is set as the evaluation value $E_1$ in accordance with a ratio (occupancy) of the area of the facial region of interest in the target region candidate. In the example of FIG. 11A, the evaluation value $E_1$ takes the maximum value Val 2 in a range $R2 \leq R < 3$, which is determined as a preferred range of the occupancy R of the facial region of interest. The evaluation value $E_1$ takes the minimum value Val 1 in a range $R < R1$ and a range $R \geq R4$, which are determined to be too small or too large. Furthermore, the evaluation value $E_1$ takes an intermediate value between the maximum value and the minimum value in accordance with the ratio in intermediate ranges $R1 \leq R < R2$ and $R3 \leq R < R4$ between the aforementioned ranges.

While the evaluation value $E_1$ in the present embodiment is set as shown in FIG. 11A, embodiments of the present invention are not limited in this way. For example, if a background region behind a person includes a large number of pixels with blown-out highlights due to image capture with overexposure, a crop region including regions with blown-out highlights is not considered as preferred framing. In the case where a region other than a region corresponding to the object includes pixels with luminance values higher than a predetermined luminance value, and a ratio of such pixels exceeds a predetermined value, the evaluation value $E_1$ may be set such that the higher the occupancy of the facial region of interest, the larger the evaluation value $E_1$. On the other hand, for example, in the case where the target image exhibits a low-luminance atmosphere as a whole due to image capture with underexposure, if the facial region of interest is too large, the atmosphere of the target image including the background is less likely to remain in a cropped image. In this case, for example, the evaluation value $E_1$ may be set such that the lower the occupancy of the facial region of interest, the higher the evaluation value $E_1$.

Figure 11B:
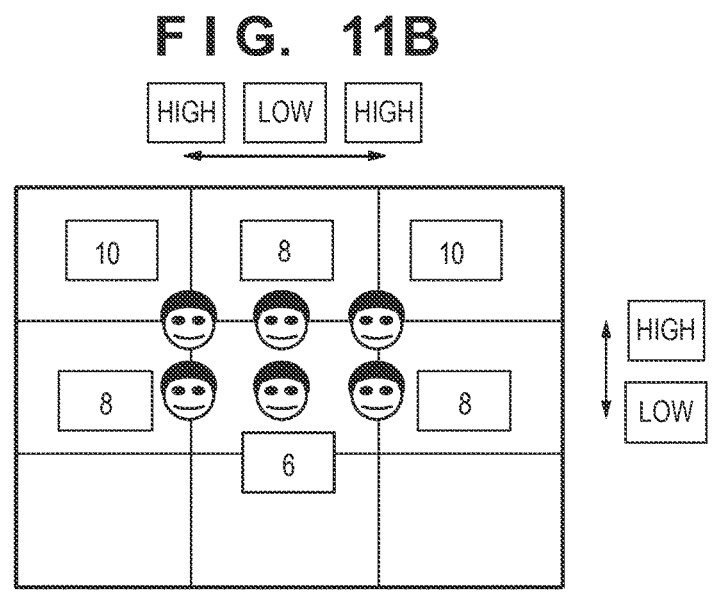

The evaluation value $E_2$ is set, for example, as shown in FIG. 11B with respect to the position in which the facial region of interest is arranged in the crop region candidate. More specifically, a higher evaluation value $E_2$ is set for a crop region candidate in which the facial region of interest is arranged on the upper line out of the lines trisecting the crop region candidate in the vertical direction and on the lines trisecting the crop region candidate in the horizontal direction, the trisecting lines providing framing that is experimentally considered preferred. It should be noted that the distribution of the evaluation value $E_2$ is not limited in this way, and may be changed such that a high evaluation is given to preferred framing determined in accordance with the result of determination of a captured scene, an image capture mode that was set at the time of image capture, and the like.

The evaluation value $E_3$ is determined in accordance with an aspect ratio of the target image such that a high evaluation value is given to an aspect ratio that is preferred for a crop region candidate. The crop region evaluation unit 114 calculates a height Hobj and a width Wobj of a minimum rectangular region that encompasses a facial region and a body region in the target image, and obtains the aspect ratio of this rectangular region, that is to say, Wobj/Hobj. Assuming that the aspect ratios of crop region candidates shown in FIG. 3 are expressed as Wtri:Htri, the crop region evaluation unit 114 obtains a similarity value between two aspect ratios using the following expressions.

(i) In the case of Wobj/Hobj<Wtri/Htri:

Aspect similarity value=(*Wobj/Hobj*)/(*Wtri/Htri*)

(ii) In the case of Wobj/Hobj≥Wtri/Htri:

Aspect similarity value=(*Wtri/Htri*)/(*Wobj/Hobj*)

Figure 11C:
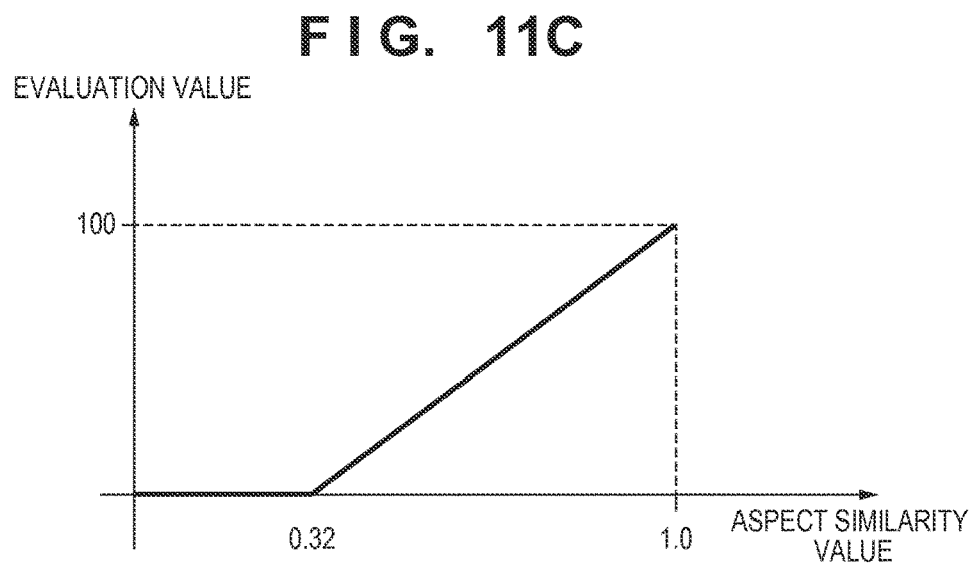

As shown in FIG. 11C, the crop region evaluation unit 114 sets a higher evaluation value $E_3$ for a crop region candidate with an aspect similarity value closer to one. Alternatively, the crop region evaluation unit 114 may determine the evaluation value $E_3$ of a crop region candidate from a similarity value based on the aspect ratio of the target image and the aspect ratio of the crop region candidate, instead of the aspect ratio of the minimum rectangular region encompassing the facial region and the body region.

The random value $E_4$ is used to vary the evaluation result such that automatically-set crop regions do not have the same framing every time. It is desirable that the random value $E_4$ be set to a value that has a small influence on other evaluation values, for example, in a range of 0.9 to 1.1, so as to prevent a significant change in the evaluation result, which leads to selection of undesirable framing as a crop region.

After calculating the evaluation value E by multiplying the four values that are acquired for the target region candidate in the above-described manner, the crop region evaluation unit 114 completes the present evaluation processing.

If the crop region evaluation unit 114 determines in step S602 that the protrusion amounts exceed the preset threshold, it allocates an evaluation value of zero (low evaluation) to the target region candidate in step S605, and then completes the present evaluation processing.

On the other hand, if it is desirable to perform cropping to include a plurality of facial regions, the crop region candidate setting unit 113 sets crop region candidates under control by the control unit 101. More specifically, the crop region candidate setting unit 113 regards all the facial regions that have been determined to overlap one another as one group. Then, the crop region candidate setting unit 113 sets the crop region candidates such that the leftmost facial region and the rightmost facial region in the group are arranged in preset positions.

Conditions regarding the leftmost facial region and the rightmost facial region may be as shown in FIG. 12. FIG. 12 shows examples of conditions regarding the arrangement positions for the case where the target image includes two facial regions. Specifically, the crop region candidates are set such that the leftmost facial region is arranged on the left line out of the lines trisecting the crop region candidates in the horizontal direction and on one of (i) the upper line out of the lines trisecting the crop region candidates in the vertical direction, (ii) the middle portion between the lines trisecting the crop region candidates in the vertical direction, and (iii) the lower line out of the lines trisecting the crop region candidates in the vertical direction. Also, the crop region candidates are set such that the rightmost facial region is arranged on the right line out of the lines trisecting the crop region candidates in the horizontal direction, and on one of (i) the upper line out of the lines trisecting the crop region candidates in the vertical direction, (ii) the central portion between the lines trisecting the crop region candidates in the vertical direction, and (iii) the lower line out of the lines trisecting the crop region candidates in the vertical direction.

Therefore, in the present step, 5×3×6=90 types of crop region candidates are set with respect to "all" target facial regions.

In step S308, under control by the control unit 101, the crop region evaluation unit 114 applies evaluation processing for multiple cropping to all of the crop region candidates set in step S307 so as to acquire evaluation values of these crop region candidates.

<Evaluation Processing (Multiple)>

Figure 13:
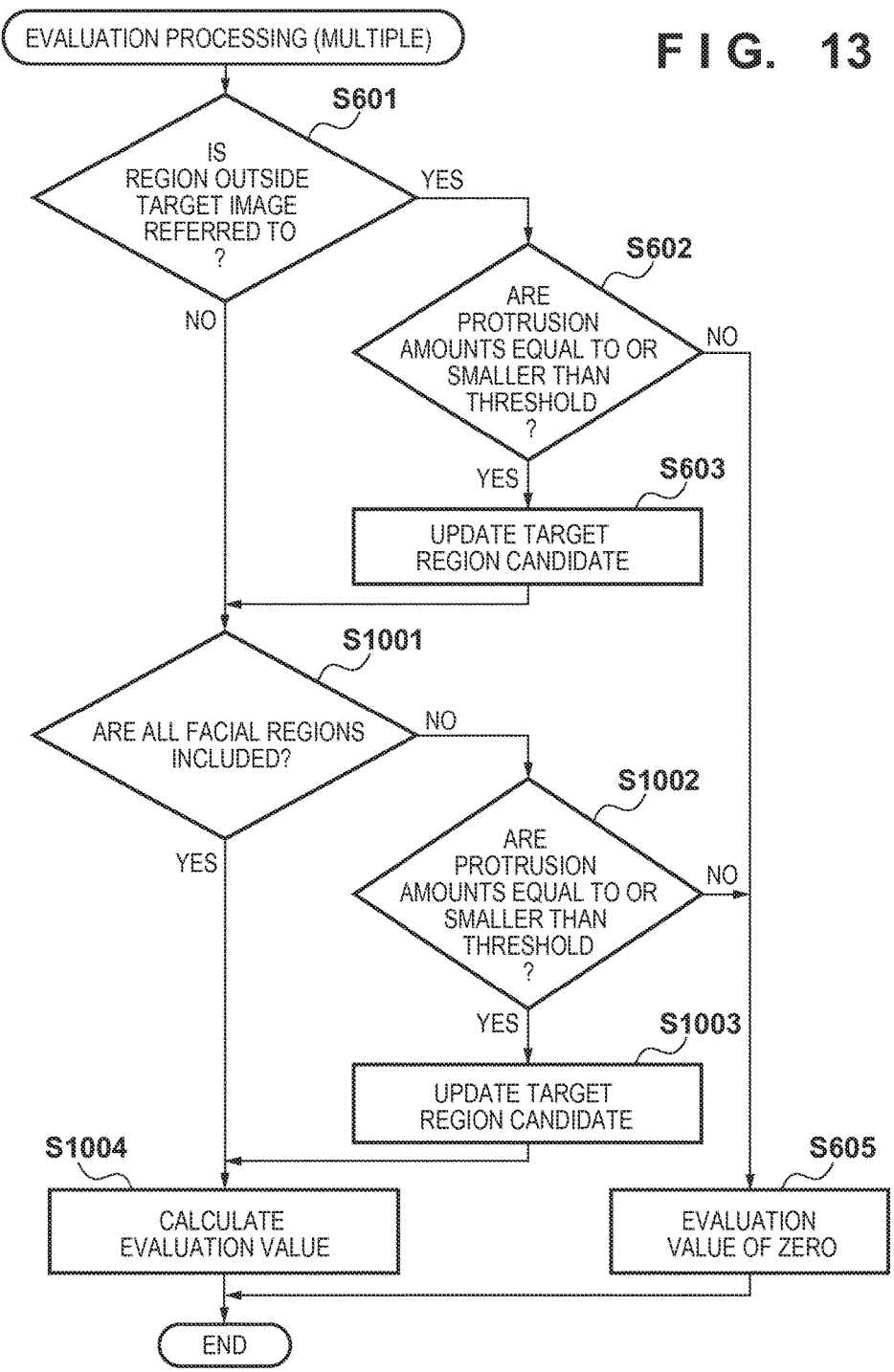
FIG. 13 is a flowchart showing an example of evaluation processing for multiple cropping.

With reference to a flowchart of FIG. 13, the following describes specifics of evaluation processing for multiple cropping executed in the present step. In the following description, steps involving processes that are similar to those in the aforementioned evaluation processing for independent cropping are given the same reference signs, and a description thereof is omitted.

After the processes up to step S603 concerning a relationship between the target region candidate and the target image, the crop region evaluation unit 114 determines in step S1001 whether or not all facial regions of the group are included in the target region candidate. The control unit 101 proceeds to the process of step S1004 if the crop region evaluation unit 114 determines that all facial regions are included in the target region candidate, and to the process of S1002 if it determines that all facial regions are not included in the target region candidate.

The crop region evaluation unit 114 determines whether or not the amounts by which a minimum rectangular region that is defined so as to include all facial regions of the group protrudes outside the target region candidate are equal to or smaller than a preset threshold. In the present step, the crop region evaluation unit 114 acquires the protrusion amounts by which facial regions protrude outside the target region candidate with respect to the horizontal and vertical directions, and determines whether or not the protrusion amounts are equal to or smaller than a threshold that allows fine adjustment of the target region candidate. More specifically, out of the facial regions of the group, the protrusion amounts of the topmost, lowermost, leftmost and rightmost facial regions outside the target region candidate are acquired and used in the determination. The control unit 101 proceeds to the process of step S1003 if the crop region evaluation unit 114 determines that the protrusion amounts are smaller than or equal to the preset threshold, and proceeds to the process of step S605 if it determines that the protrusion amounts exceed the preset threshold.

Figure 14:
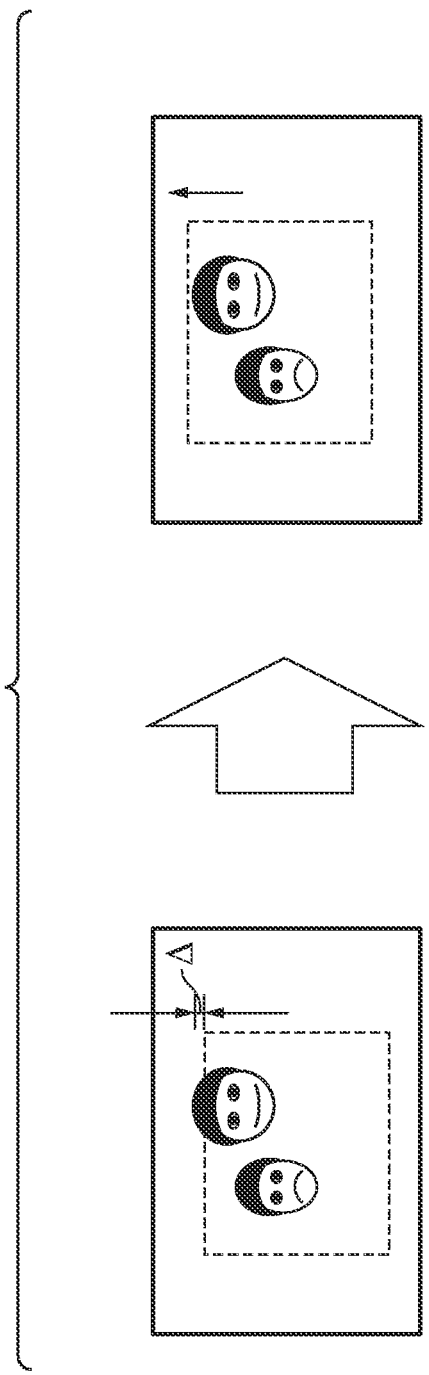
FIG. 14 shows diagrams for describing processing for the case where a facial region exists outside a crop region candidate.
Figure 16A:
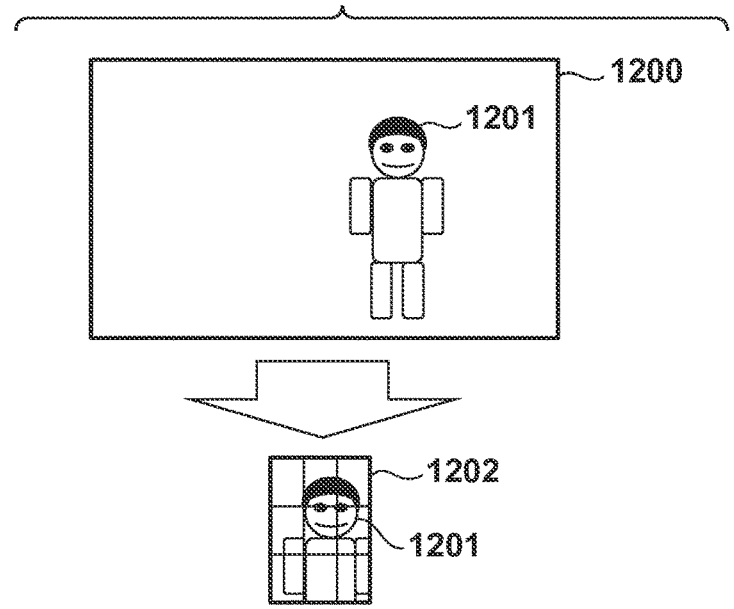
FIGS. 16A and 16B are diagrams for describing a problem of a conventional crop technique.
Figure 16B:
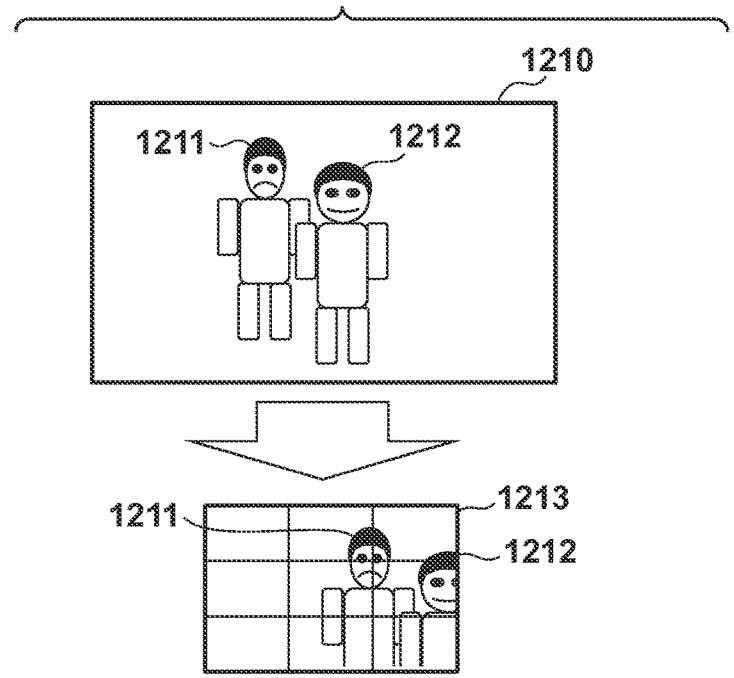

In step S1003, under control by the control unit 101, the crop region candidate setting unit 113 updates a reference range in accordance with information of the protrusion amounts acquired in step S1002, such that all facial regions of the group fit inside the target region candidate. For example, if a protrusion amount Δ in the vertical direction is equal to or smaller than the threshold that allows fine adjustment as shown in FIG. 14, it is sufficient to update the target region candidate by translating the target region candidate only by Δ in the vertical direction. If all facial regions in the group do not fit inside the target region candidate even with the updating of the position of the target region candidate in the present step, the processing moves to step S605. Alternatively, an evaluation value may be calculated in later-described step S1004 in the state where all facial regions do not fit inside the target region candidate, and a value obtained by multiplying the calculated evaluation value by a coefficient smaller than 1 (e.g., 0.8) may be used as a new evaluation value.

Once the target region candidate has been set in the above manner, the crop region evaluation unit 114 calculates an evaluation value of the target region candidate in step S1004, similarly to step S604 of the evaluation processing for independent cropping, and then completes the present evaluation processing. The evaluation method used in the present step may be similar to or different from the evaluation method used for the case of independent cropping. When using a method similar to the method used for the case of independent cropping, it is sufficient to use an average of occupancies calculated for all facial regions in the target region candidate as the evaluation value $E_1$, and to use a total of evaluation values for the arrangement positions of all facial regions as the evaluation value $E_2$. The evaluation value $E_2$ may simply be set such that the longer the distance between the lowermost facial region in the group and the lower edge of the target region candidate, the larger the evaluation value $E_2$.

On the other hand, if the control unit 101 determines that the number of facial regions included in the target image is equal to or greater than the predetermined number in step S302 of the crop region candidate determination processing, the crop region candidate setting unit 113 sets crop region candidates for a group photograph in step S309. More specifically, the crop region candidate setting unit 113 sets the crop region candidates with the barycentric position of all facial regions in the target image serving as the center. As mentioned earlier, in the present embodiment, crop region candidates are preset so as to conform to five types of aspect ratios and three sizes for each aspect ratio, and therefore 5×3=15 types of crop region candidates are set in the present step.

In step S310, under control by the control unit 101, the crop region evaluation unit 114 calculates evaluation values of all crop region candidates set in step S309. While specifics of evaluation processing for cropping of a group photograph are not described herein, the evaluation shall be performed on the premise that all facial regions are included.

This concludes the description of the method for determining crop region candidates for the case where the target image includes at least one facial region.

While the evaluation method is changed depending on the number of detected facial regions in the above description, embodiments of the present invention are not limited in this way. That is to say, it is easily predicted that there should be no problem in applying the aforementioned evaluation processing for multiple cropping to crop region candidates set for a target image that includes only one facial region.

A description is now given of a method for determining crop region candidates for the case where the object region extraction unit 111 has output object region candidates, that is to say, for the case where the target image does not include facial regions. As described above, in the case where the target image does not include any facial region, objects regions are determined based on the evaluation values and priority orders calculated by the regional priority setting unit 112.

With regard to facial regions, the crop region candidate setting unit 113 determines whether or not captured objects corresponding to facial regions overlap in the target image; in contrast, with regard to object regions that are not facial regions, this determination is not performed. This is because it is considered that a user would not be bothered by protrusion of an object other than a face outside a crop region. Therefore, in the case where the target image does not include any facial region, it is sufficient to set crop region candidates for each object region using a method similar to the method used for the case where one facial region has been detected.

More specifically, upon acquisition of information of the position and size of an object region that is not a facial region, the crop region candidate setting unit 113 positions the object region on the basis of line segments trisecting the crop region candidate in the horizontal and vertical directions. Alternatively, the crop region candidates may be set such that an object region that is not a facial region is positioned at the center, or the crop region candidates may include only a part of an object region that is not a facial region. In these cases, the object region should occupy at least 50 percent of each crop region candidate, and the crop region candidates should be set such that both edges of the object region in the horizontal or vertical directions do not protrude outside the crop region candidates.

Then, the crop region evaluation unit 114 applies evaluation processing for independent cropping to all crop region candidates that have been set, so as to acquire evaluation values of the crop region candidates. At this time, it is sufficient to execute processing similar to the evaluation processing for facial regions.

<Methods for Selecting Crop Region and Determining Similarity>

Next, a description is given of a method for selecting a crop region in the similarity determination unit 116 and the crop region selection unit 115.

FIG. 15 is a flowchart of a method for determining a crop region from among crop region candidates that have been set for one object region based on evaluation values calculated for the crop region candidates in the present embodiment. Processing of the present flowchart is completed each time one crop region is determined, but is repeatedly executed until the number of crop regions preset for one object region (the number of crop images to be generated) is selected. Furthermore, if the target image includes a plurality of object regions, this processing selects detected object regions in order from the highest priority, and is executed until a predetermined number of crop regions are set for each object region.

First, in step S1501, the crop region selection unit 115 selects, from among the crop region candidates that have been set, a crop region candidate for which the largest evaluation value has been calculated as a determination target candidate. The crop region selection unit 115 then outputs information of the selected determination target candidate to the similarity determination unit 116.

In step S1502, in accordance with the received information of the determination target candidate, the similarity determination unit 116 determines similarity between the crop region candidate selected as a determination target (determination target candidate) and crop regions that have already been determined for the same object region in terms of aspect ratio. More specifically, the similarity determination unit 116 compares the aspect ratios of all crop regions that have already been determined with the aspect ratio of she determination target candidate; if a difference therebetween falls within a predetermined range, it proceeds to the process of step S1503. On the other hand, if the difference therebetween does not fall within the predetermined range, the similarity determination unit 116 outputs to the crop region selection unit 115 a determination result indicating no similarity, and proceeds to the process of step S1506. Then, in step S1506, the crop region selection unit 115 determines the determination target candidate as one of crop regions for the object region in process, and completes the present selection processing.

In step S1503, the similarity determination unit 116 determines similarity between the determination target candidate and crop regions that have already been determined for the same object region in terms of size. The similarity determination unit 116 compares the sizes of all crop regions that have already been determined with the size of the determination target candidate; if a difference therebetween falls within a predetermined range, it proceeds to the process of step S1504. On the other hand, if the difference therebetween does not fall within the predetermined range, the similarity determination unit 116 outputs to the crop region selection unit 115 a determination result indicating no similarity, and proceeds to the process of step S1506.

In step S1504, the similarity determination unit 116 determines similarity between the determination target candidate and crop regions that have already been determined for the same object region in terms of crop range. First, the similarity determination unit 116 acquires region start coordinates for all of the crop regions and the determination target candidate (for example, coordinates of the upper left corners of the regions). Then, the similarity determination unit 116 calculates differences between the region start coordinates of the crop regions and the region start coordinates of the determination target candidate in the horizontal and vertical directions; if any of the differences satisfies both of the conditional expressions provided below, it outputs to the crop region selection unit 115 a determination result indicating similarity, and proceeds to the process of step S1505. If none of the differences satisfies at least one of the conditional expressions, the similarity determination unit 116 outputs to the crop region selection unit 115 a determination result indicating no similarity, and proceeds to the process of step S1506.

(Difference between region start coordinates in the horizontal direction)/(the number of pixels in crop region in the horizontal direction)<½

(Difference between region start coordinates in the vertical direction)/(the number of pixels in crop region in the vertical direction)<½

In step S1505, based on the received determination result, the crop region selection unit 115 does not determine the determination target candidate as a crop region, and omits the determination target candidate from the crop region candidates. Then, the crop region selection unit 115 selects a crop region candidate with the second largest evaluation value next to the determination target candidate for which the determination had been performed thus far as a new determination target candidate, outputs information of the new determination target candidate to the similarity determination unit 116, and returns to the process of step S1502.

In the case where a plurality of crop images are to be generated for one object region, the above processing can omit setting of crop regions with similar framing.

Information of crop regions thus determined is transferred to the crop region extraction result output unit 117. The crop region extraction result output unit 117 applies crop processing to the target image in accordance with the transferred information, and outputs resultant crop images.

As described above, the image processing apparatus according to the present embodiment detects a specific object included in an obtained target image to which cropping is to be applied. With respect to this target image, the image processing apparatus sets and evaluates one or more crop region candidates with which one detected object is arranged in a position that satisfies predetermined conditions in a cropped region.

This makes it possible to set not only arrangement positions of objects in a crop region, but also a crop region with preferred framing that includes all specific objects.

Furthermore, if a crop region candidate with a large evaluation value is similar to other crop regions that have already been selected for the same object region, this crop region candidate is not selected as a crop region; consequently, generation of a plurality of similar crop images can be suppressed.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro Processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Applications No. 2012-283671, filed Dec. 26, 2012, No. 2012-286167, filed Dec. 27, 2012, and No. 2013-234313, filed Nov. 12, 2013, which are hereby incorporated by reference herein in their entirety.

What is claimed is:

1. An image processing apparatus comprising:
a processor; and
a memory including instructions that, when executed by the processor, cause the processor to:
   specify object regions from an image;
   set a plurality of crop region candidates for each of the specified object regions;
   obtain evaluation values of the set plurality of crop region candidates;
   select a predetermined number of crop regions from among the plurality of crop region candidates, wherein a crop region candidate having the highest evaluation value among the plurality of crop region candidates is selected as one crop region, and remaining crop regions are selected after selecting the one crop region; and
   generate, from the image, crop images corresponding to each of the predetermined number of crop regions,
wherein in the selecting of the remaining crop regions, the instructions, when executed by the processor, cause the processor to repeat the following processing until the predetermined number of crop regions are selected:
   choose a crop region candidate having the next highest evaluation value from among the plurality of crop region candidates;
   perform similarity determination processing which determines whether the chosen crop region candidate including at least a portion of a specific object region has a similarity with any of the already selected crop regions including at least a portion of the specific object region;
   in a case where it is determined, in the similarity determination processing, that the chosen crop region candidate including at least a portion of the specific object region has a similarity with any of the already selected crop regions including at least a portion of the specific object region, omit the chosen crop region candidate from the crop region candidates; and
   in a case where it is determined, in the similarity determination processing, that the chosen crop region candidate including at least a portion of the specific object region does not have a similarity with the already selected crop regions including at least a portion of the specific object region, select the chosen crop region candidate as a crop region,
wherein the crop images corresponding to each of the selected crop regions are displayed on a display device.

2. The image processing apparatus according to claim 1, wherein the similarity determination processing is performed based on a difference between an aspect ratio of the chosen crop region candidate including at least a portion of the specific object region and an aspect ratio of each of the already selected crop regions including at least a portion of the specific object region.

3. The image processing apparatus according to claim 1, wherein the similarity determination processing is performed based on a difference between a size of the chosen crop region candidate including at least a portion of the specific object region and a size of each of the already selected crop regions including at least a portion of the specific object region.

4. The image processing apparatus according to claim 1, wherein the similarity determination processing is performed based on a difference between region start coordinates of the chosen crop region candidate including at least a portion of the specific object region and region start coordinates of each of the already selected crop regions including at least a portion of the specific object region.

5. The image processing apparatus according to claim 1, wherein the instructions, when executed by the processor, further cause the processor to:
   obtain the evaluation values of the set plurality of crop region candidates based on areas and distances from an image center.

6. The image processing apparatus according to claim 1, wherein the instructions, when executed by the processor, further cause the processor to:
   extract, from the image, images of regions defined by the selected predetermined number of crop regions, and output the extracted images.

7. An image capturing apparatus comprising:
an image sensor which captures an image; and
an image processing apparatus comprising:
- a processor; and
- a memory including instructions that, when executed by the processor, cause the processor to:
  - specify object regions from the image,
  - set a plurality of crop region candidates for each of the specified object regions,
  - obtain evaluation values of the set plurality of crop region candidates,
  - select a predetermined number of crop regions from among the plurality of crop region candidates, wherein a crop region candidate having the highest evaluation value among the plurality of crop region candidates is selected as one crop region, and remaining crop regions are selected after selecting the one crop region, and
  - generate, from the image, crop images corresponding to each of the predetermined number of crop regions,
- wherein in the selecting of the remaining crop regions, the instructions, when executed by the processor, cause the processor to repeat the following processing until the predetermined number of crop regions are selected:
  - choose a crop region candidate having the next highest evaluation value from among the plurality of crop region candidates;
  - perform similarity determination processing which determines whether the chosen crop region candidate including at least a portion of a specific object region has a similarity with any of the already selected crop regions including at least a portion of the specific object region;
  - in a case where it is determined, in the similarity determination processing, that the chosen crop region candidate including at least a portion of the specific object region has a similarity with any of the already selected crop region including at least a portion of the specific object region, omit the chosen crop region candidate from the crop region candidates; and
  - in a case where it is determined, in the similarity determination processing, that the chosen crop region candidate including at least a portion of the specific object region does not have a similarity with the already selected crop regions including at least a portion of the specific object region, select the chosen crop region candidate as a crop region,
- wherein the crop images corresponding to each of the selected crop regions are displayed on a display device.

8. An image processing method comprising:
specifying object regions from an image;
setting a plurality of crop region candidates for each of the specified object regions;
obtaining evaluation values of the set plurality of crop region candidates;
selecting a predetermined number of crop regions from among the plurality of crop region candidates, wherein a crop region candidate having the highest evaluation value among the plurality of crop region candidates is selected as one crop region, and the remaining crop regions are selected after selecting the one crop region; and
generating, from the image, crop images corresponding to each of the predetermined number of crop regions,
wherein in the selecting of the remaining crop regions, the method comprises repeating the following processing until the predetermined number of crop regions are selected:
- choosing a crop region candidate having the next highest evaluation value from among the plurality of crop region candidates;
- performing similarity determination processing which determines whether the chosen crop region candidate including at least a portion of a specific object region has a similarity with any of the already selected crop regions including at least a portion of the specific object region;
- in a case where it is determined, in the similarity determination processing, that the chosen crop region candidate including at least a portion of the specific object region has a similarity with any of the already selected crop region, omitting the chosen crop region candidate from the crop region candidates including at least a portion of the specific object region; and
- in a case where it is determined, in the similarity determination processing, that the chosen crop region candidate including at least a portion of the specific object region does not have a similarity with the already selected crop regions, selecting the chosen crop region candidate as a crop region including at least a portion of the specific object region,
wherein the crop images corresponding to each of the selected crop regions are displayed on a display device.

9. A non-transitory computer-readable storage medium having stored thereon a program that, when executed by a computer, causes the computer to:
specify object regions from an image;
set a plurality of crop region candidates for each of the specified object regions;
obtain evaluation values of the set plurality of crop region candidates;
select a predetermined number of crop regions from among the plurality of crop region candidates, wherein a crop region candidate having the highest evaluation value among the plurality of crop region candidates is selected as one crop region, and the remaining crop regions are selected after selecting the one crop region; and
generate, from the image, crop images corresponding to each of the predetermined number of crop regions,
wherein in the selecting of the remaining crop regions, the program, when executed by the computer, causes the computer to repeat the following processing until the predetermined number of crop regions are selected:
- choose a crop region candidate having the next highest evaluation value from among the plurality of crop region candidates;
- perform similarity determination processing which determines whether the chosen crop region candidate including at least a portion of a specific object region has a similarity with any of the already selected crop regions including at least a portion of the specific object region;
- in a case where it is determined, in the similarity determination processing, that the chosen crop region candidate including at least a portion of the specific object region has a similarity with any of the already selected crop region including at least a portion of the specific object region, omit the chosen crop region candidate from the crop region candidates; and in a case where it is determined, in the similarity determination processing, that the chosen crop region candidate including at least a portion of the specific object region does not have a similarity with the already selected crop regions, select the chosen crop region candidate as a crop region including at least a portion of the specific object region, wherein the crop images corresponding to each of the selected crop regions are displayed on a display device.

* * * * *